United States Patent [19]

O'Brien

[11] Patent Number: 4,555,616
[45] Date of Patent: Nov. 26, 1985

[54] ELECTRICALLY HEATED WOK

[75] Inventor: William J. O'Brien, Vaucluse, Australia

[73] Assignee: Breville Holdings Pyt. Limited, New South Wales, Australia

[21] Appl. No.: 645,171

[22] Filed: Aug. 28, 1984

[30] Foreign Application Priority Data

Aug. 31, 1983 [AU] Australia .............................. PG1159

[51] Int. Cl.⁴ ............................................ F27D 11/02
[52] U.S. Cl. .................................. 219/432; 219/430; 219/439; 219/462; 219/463
[58] Field of Search ............... 219/430, 432, 433, 436, 219/439, 455, 456, 460, 461, 467, 535, 521, 530; 99/426, 427, 440; 126/39 E, 39 BA

[56] References Cited

U.S. PATENT DOCUMENTS

| 1,673,296 | 6/1928 | McMannus | 219/456 X |
| 3,826,897 | 7/1974 | Behr et al. | 219/456 |
| 4,268,741 | 5/1981 | O'Brien | 219/439 |
| 4,313,050 | 1/1982 | Abenaim | 219/432 |
| 4,313,416 | 2/1982 | Lau | 126/39 E |
| 4,435,638 | 5/1984 | Simon | 219/460 |
| 4,458,139 | 7/1984 | McClean | 219/433 |
| 4,492,853 | 1/1985 | Lam | 219/432 |

Primary Examiner—Volodymyr Y. Mayewsky

[57] ABSTRACT

An electrically heated wok having a bowl of substantial thickness preferably formed from aluminium by gravity or sand casting and having an electrical heating element on the underside thereof, the bowl being supported on an annular skirt surrounding the heating element, the bowl being tiltable in relation to the skirt and being guided by a guide member associated with the skirt and with which portions of the bowl interact, a locking lever being provided for engagement with detents on the skirt so that the bowl can be fixed in a number of predetermined tilted positions in relation to the skirt.

7 Claims, 6 Drawing Figures

ELECTRICALLY HEATED WOK

The present invention relates to an electrically heated wok, a wok being a large, shallow, round bottomed, metal bowl used for frying especially in Chinese cooking.

In its simplest form a wok consists of a part-spherical shell of sheet metal with which there may or may not be associated a handle. In order to heat a wok conveniently over a gas flame it is common practice to provide a plain metal ring which surrounds the gas burner and supports the curved bottom of the wok. It is also known to provide electrically heated woks in which an electric heating element is incorporated into the bottom of the bowl, the bowl being supported on a stand permanently secured to it. Such electrically heated woks have not been very successful commercially owing to poor distribution of heat from the heater element, the heat being concentrated in the bottom of the wok, and the fact that tilting of the wok which is necessary in some forms of cooking is very difficult.

The object of the present invention is to provide an electrically heated wok in which these difficulties are largely overcome.

The present invention consists in an electrically heated wok consisting of a bowl having a wall the inner surface of which is a smooth part-spherical surface and the outer surface of which is smooth and part-spherical except in its central area, the wall being of substantial thickness and preferably formed from aluminium by gravity or sand casting, an electrical heating element on the underside of the bowl and electrical connected means for enabling an electrical connection to be made to said heating element, an annular supporting skirt surrounding said heating element and making sliding contact with the smooth portion of the undersurface of the bowl, guiding means for guiding movement of the bowl in relation to the skirt, means on the bowl engaging said guiding means and means for locking the bowl in any one of a plurality of positions in relation to said skirt. Preferably the bowl is provided with one or more handles and a lid.

In order that the invention may be better understood and put into practice a preferred form thereof is hereinafter described by way of example with reference to the accompanying drawings in which.

Figure 1:
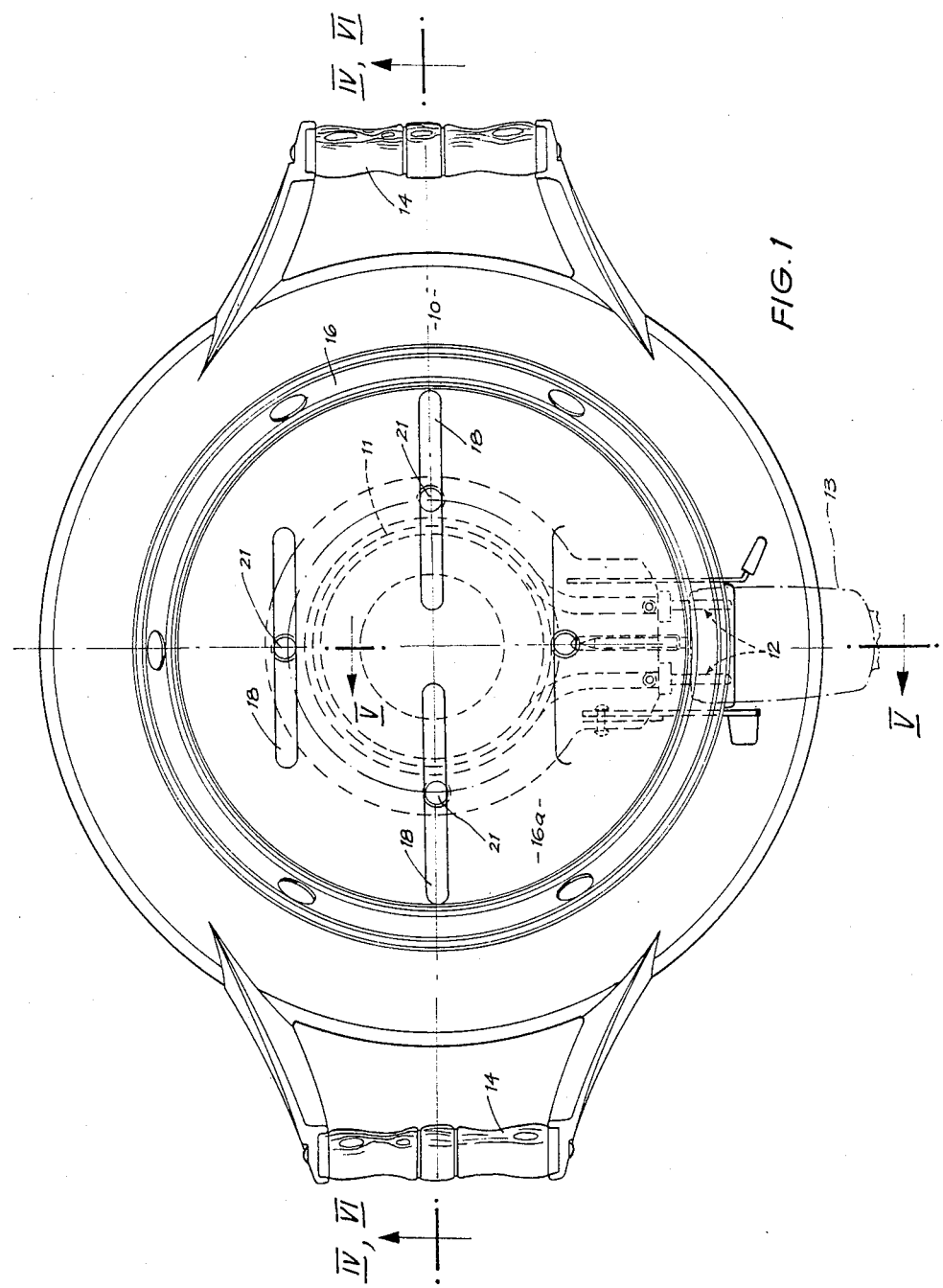
FIG. 1 is a plan view of a wok according to the invention from below.

The electrically heated wok illustrated in the accompanying drawings consists of a bowl 10 which is made by casting from aluminium by gravity or sand casting and has a thickness of the order of 3–4 millimeters near its rim. It has been found most desirable to make the bowl of material of substantial thickness in contrast to the normal sheet metal bowl used in electric woks as this much improves the heat distribution and the culinary properties of the implement. The use of sand cast or gravity cast aluminium is preferred in that such castings have much less porosity than do aluminium die castings and better thermal properties.

The inside of the bowl is part spherical and has a smooth surface which is preferably coated with a non-stick material such as "Teflon" (Registered Trade Mark). The outer surface of the bowl 10 is also smooth and part-spherical except near the middle where an electric heater element 11 is cast into the material of the bowl and appropriate adjustments are made to the shape and thickness of the bowl to accommodate the electric heater element. The ends of the element 11 are connected to an electrical connector 12 through which electrical connection may be made to the heater 11 and a controlled supply of electricity furnished through the thermostat plug 13, the bowl is provided with two diametrically opposed handles 14 on its upper rim and a removable lid 15. The bowl is supported on a sheet metal skirt 16 which is in the form of a circular sleeve having in its upper edge mouldings 17 of material such as "Teflon" which facilitate sliding of the bowl in relation to the base 16. The base 16 has within it a dished sheet metal supporting member 16a in which are three slots 18 through which pins 21 formed integrally with the bowl project.

Figure 2:
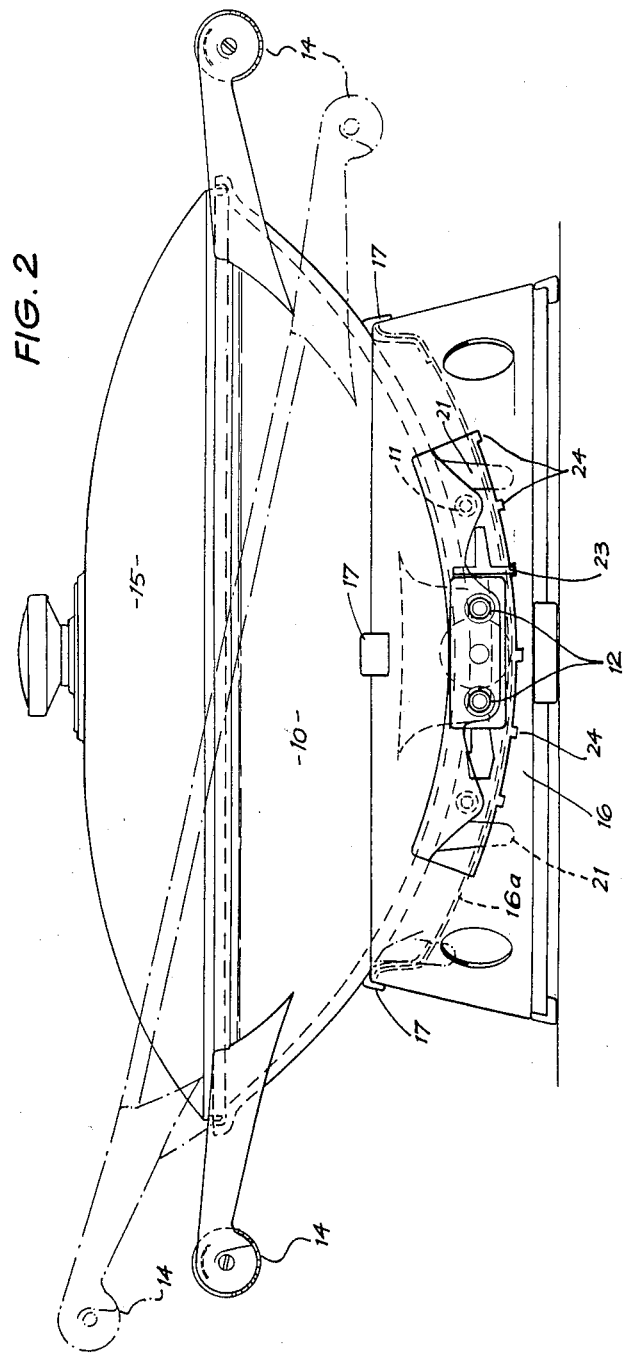
FIG. 2 is a side elevation thereof.
Figure 3:
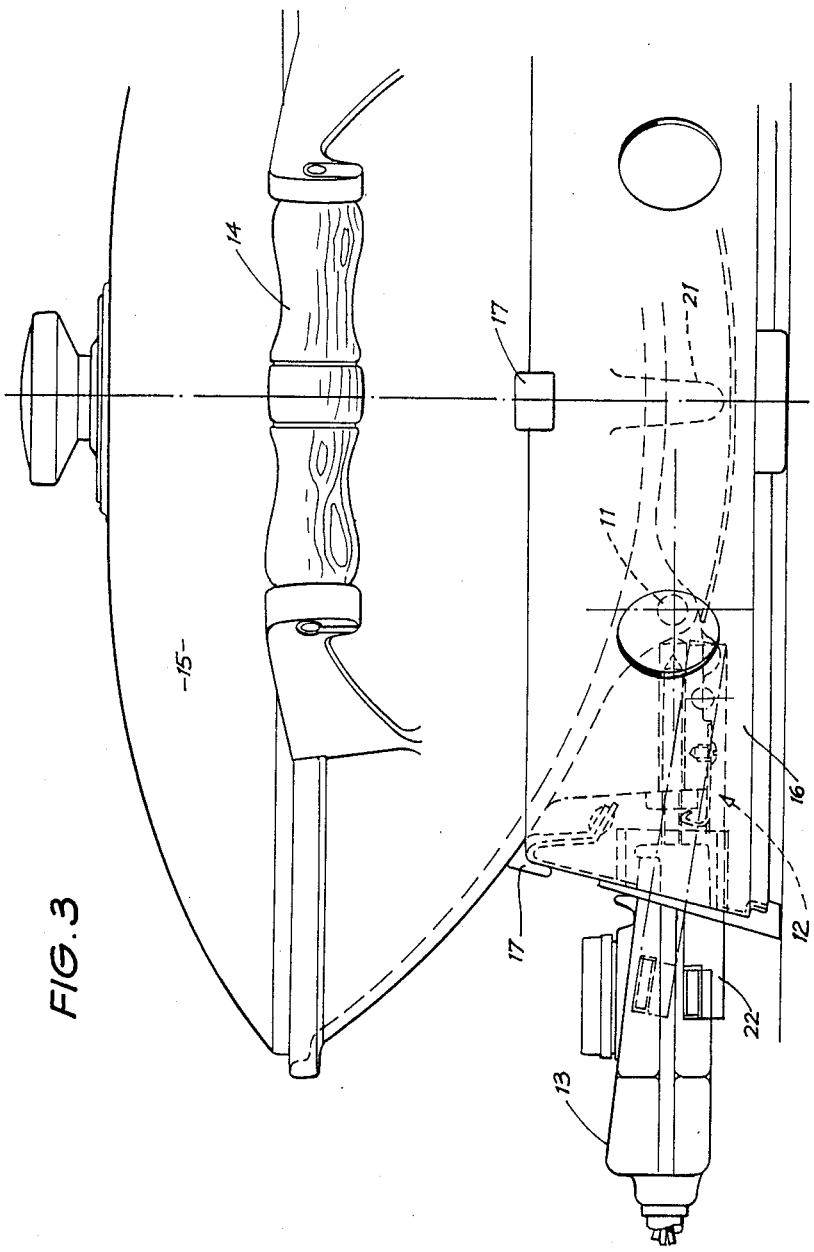
FIG. 3 is an end elevation.
Figure 4:
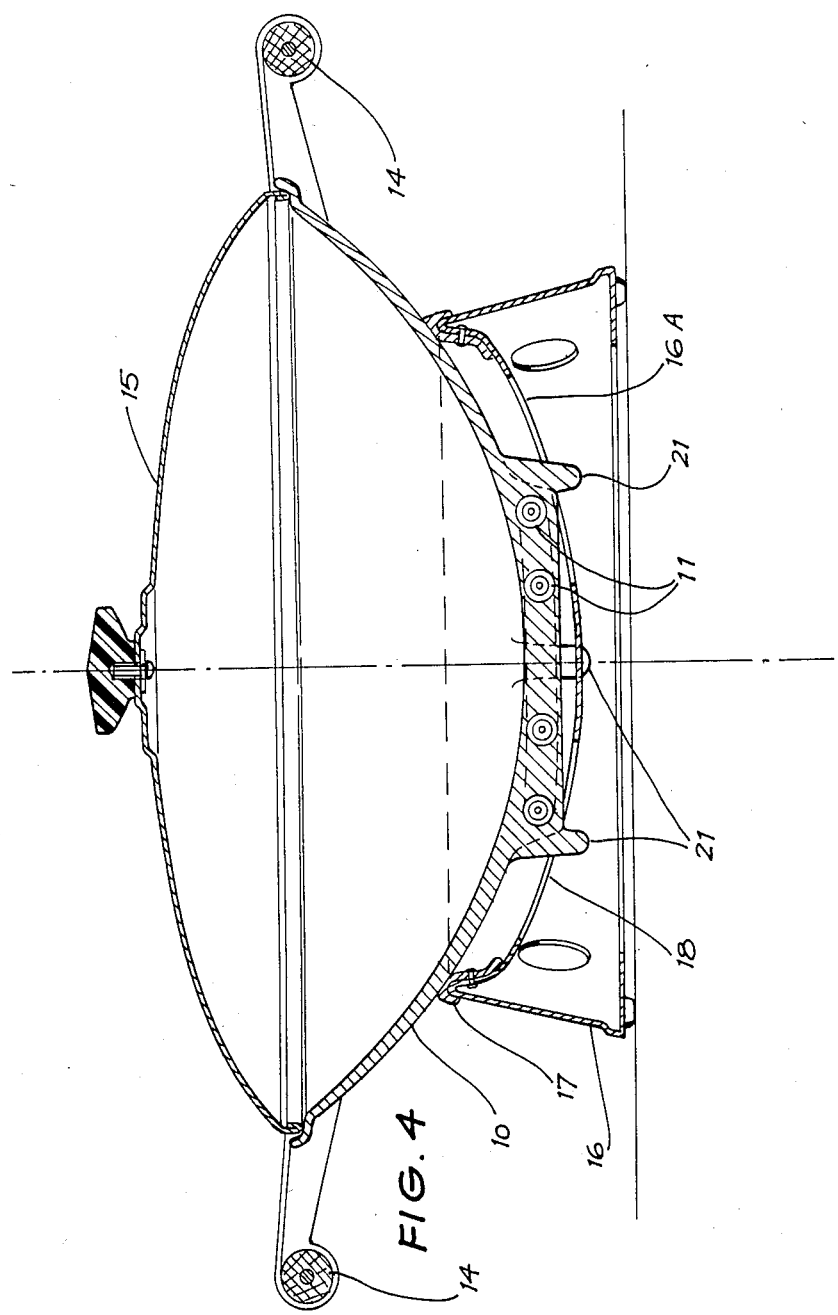
FIG. 4 is a side elevation, in section, taken along line IV, IV of FIG. 1.
Figure 5:
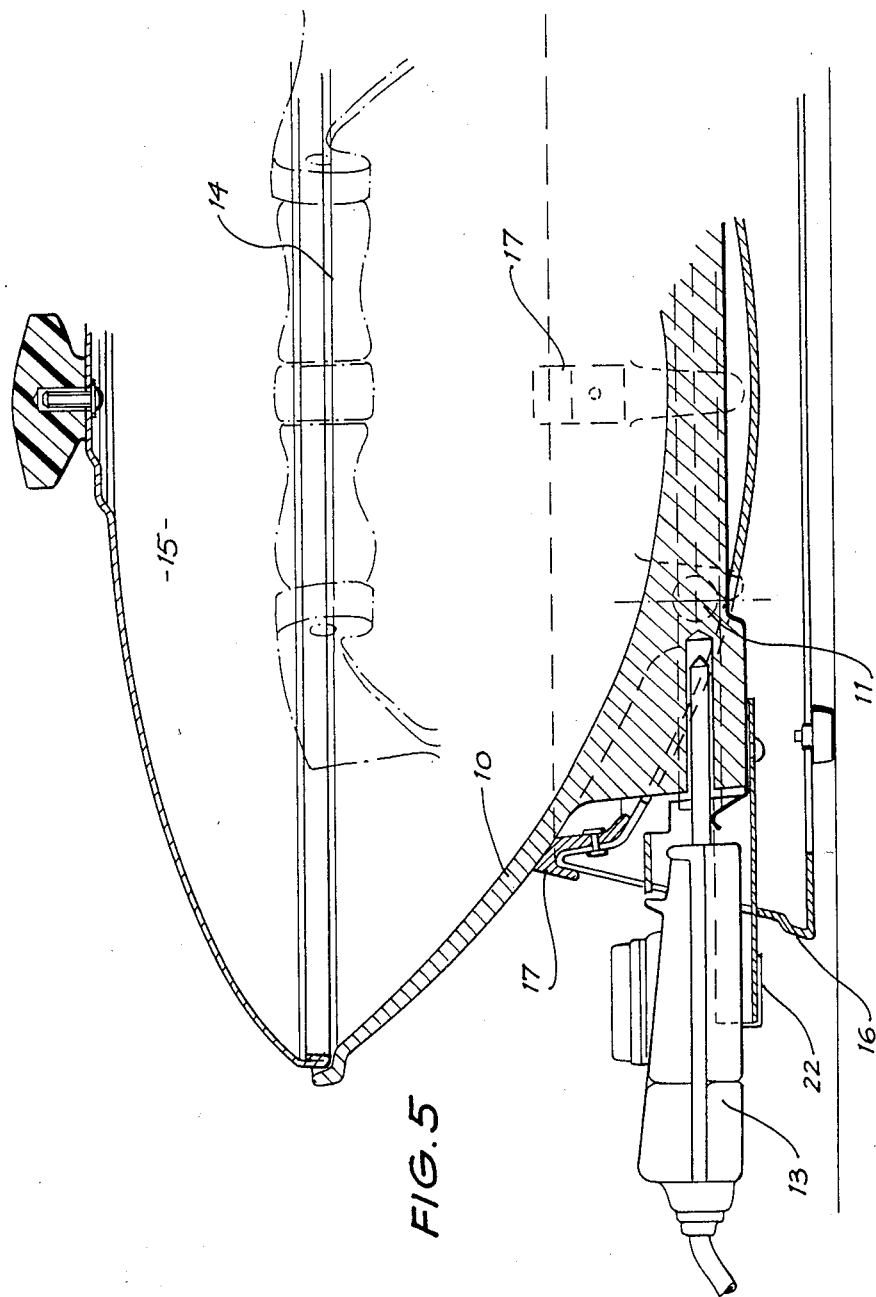
FIG. 5 is an end elevation, in section, taken along line V—V of FIG. 1.
Figure 6:
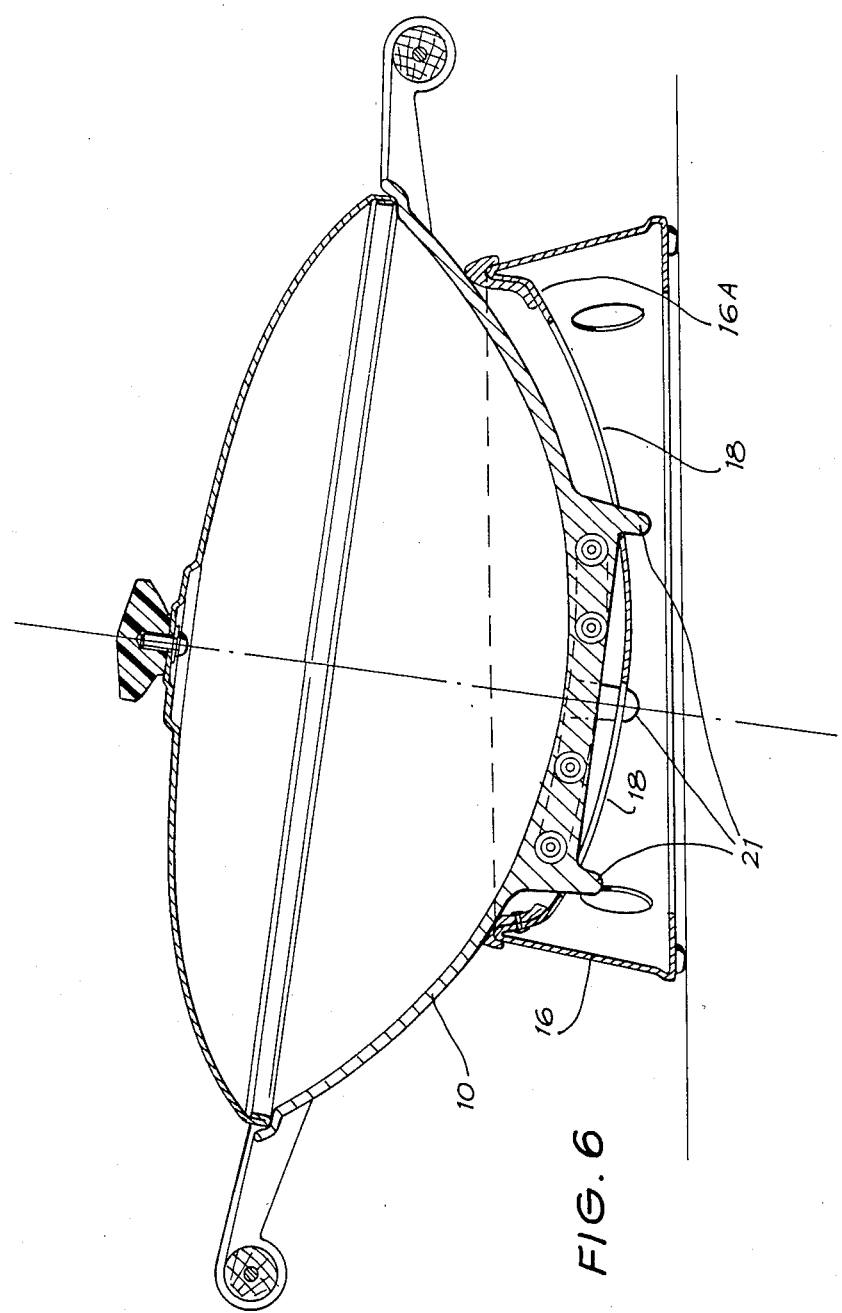
FIG. 6 is a side elevation, in section, taken along line VI—VI of FIG. 1 showing the wok in a tilted position.

While the bowl may be tilted in relation to the base for example by depressing the right hand handle 14 as shown in FIG. 2 to the broken line position the extent of movement is limited by interaction between the pins 21 and the slots 18 so that in particular form of the invention depicted tilting is limited to tilting about a horizontal axis at right angles to a line joining the midpoint of the handle 14.

The lever 22 is pivoted to a point on the underside of the bowl and has a lower edge 23 which may be engaged in any one of a number of locking notches 24 arranged in an aperture in the skirt 16. Co-action between the edge 23 and any one of the slots 24 enables the bowl to be tilted in relation to the skirt 16 and fixed in any one of a number of predetermined positions.

The construction described above has substantial advantages over other electrically heated woks in that by the use of thicker gauge material for the bowl the cooking qualities are greatly improved. The use of a base on which the bowl is tiltably supported permits tilting of the bowl to suit the cooking procedure being conducted. However, the provision pf guiding means on the means interacting with the base tends to minimize the danger of the bowl being tilted excessively or uncontrollably. This is particularly important when the wok is being used for deep frying and contains a substantial quantity of very hot fat. Finally the ability to fix the wok in a tilted position facilitates culinary operations in that both of the cooks hands are freed.

While the construction described permits tilting of the bowl in one direction only it is within the scope of the invention to provide a mounting, for example including a gimbal, which allows for tilting in a plurality of directions.

In order to enable a wok according to the present invention to be used for fondue and "steamboat" cookery it may be provided with an adjunct consisting of a flat lid that sits across the opening of the bowl. The lid is provided with a central hole of a diameter of for example 3 or 4 inches. The hole is surrounded by an upstanding collar having at is upper end an inwardly projecting flange. In the flange are a series of radial slots. The slots and the flange provide a means for supporting fondue forks or implements used in what is known as "steamboat" cookery. The implements concerned are supported in a slightly inclined position with one end resting on the bottom of the wok and the other projecting above the top of the lid. The use of such a lid in combination with the wok enlarges the scope of the cooking activities in connection with which it may be used.

I claim:

1. An electrically heated wok comprising a bowl of rigid heat-conductive material having a wall the inner surface of which is a smooth part-spherical surface and the outer surface of which is smooth and part-spherical except in its central area, the wall being of substantial thickness, an electrical heating element embedded in the underside of the bowl and electrically insulated therefrom, an electrical connector means for enabling an electrical connection to be made to said heating element, an annular supporting skirt of rigid material surrounding said heating element and making sliding contact with the smooth portion of the undersurface of the bowl, guiding means for guiding movement of the bowl in relation to the skirt, means on the bowl engaging said guiding means and means for locking the bowl in any one of a plurality of positions in relation to said skirt.

2. An electrically heated wok as claimed in claim 1, wherein the bowl is formed from aluminium by casting.

3. An electrically heated wok as claimed in claim 1 or claim 2, wherein said guiding means comprises a dished supporting member having in it a plurality of parallel slots and the means on the bowl engaging said guiding means are projections thereon passing through said slots.

4. An electrically heated wok as claimed in claim 3, wherein said means for locking the bowl comprises a pivotable lever and a plurality of notches spaced apart along an aperture in said skirt, a portion of said lever being engageable in any one of said notches.

5. An electrically heated wok as claimed in claim 4 having a pair of diametrically opposed handles on the upper rim thereof.

6. An electrically heated wok as claimed in claim 2, wherein the bowl is formed by gravity casting.

7. An electrically heated wok as claimed in claim 2, wherein the bowl is formed by sand casting.

* * * * *